United States Patent [19]
Hiroki et al.

[11] Patent Number: 5,790,513
[45] Date of Patent: Aug. 4, 1998

[54] MAGNETO-OPTICAL RECORDING MEDIUM CAPABLE OF SUPER RESOLUTION REPRODUCTION AND INFORMATION REPRODUCTION METHOD USING THE SAME

[75] Inventors: Tomoyuki Hiroki, Zama; Naoki Nishimura, Tokyo, both of Japan

[73] Assignee: Canon Kabushiki Kaisha, Tokyo, Japan

[21] Appl. No.: 631,109

[22] Filed: Apr. 12, 1996

[30] Foreign Application Priority Data

Apr. 14, 1995 [JP] Japan ................... 7-089402

[51] Int. Cl.⁶ .......................................... G11B 7/00
[52] U.S. Cl. ................. 369/275.2; 369/283; 369/13
[58] Field of Search ..................... 369/275.2, 275.1, 369/283, 284, 13, 47, 48, 58

[56] References Cited

U.S. PATENT DOCUMENTS

| | | | |
|---|---|---|---|
| 5,428,585 | 6/1995 | Hirokane et al. | 369/13 |
| 5,563,852 | 10/1996 | Morakami et al. | 369/275.2 |

FOREIGN PATENT DOCUMENTS

| | | |
|---|---|---|
| 62-175948 | 8/1987 | Japan. |
| 3-93056 | 4/1991 | Japan. |
| 3-93058 | 4/1991 | Japan. |
| 3-255946 | 11/1991 | Japan. |
| 4-229432 | 8/1992 | Japan. |
| 4-255946 | 9/1992 | Japan. |
| 4-255947 | 9/1992 | Japan. |

*Primary Examiner*—Muhammad N. Edun
*Attorney, Agent, or Firm*—Fitzpatrick, Cella, Harper & Scinto

[57] ABSTRACT

A magneto-optical recording medium includes a first magnetic layer which becomes an in-plane magnetization film at room temperature, and a perpendicular magnetization film at a temperature between room temperature and the Curie temperature of the layer, a second magnetic layer which has a Curie temperature lower than the Curie temperature of the first magnetic layer, remains a perpendicular magnetization film from room temperature to its Curie temperature, and is stacked on the first magnetic layer, and a third magnetic layer which is arranged between the first and second magnetic layers and has a Curie temperature lower than the Curie temperatures of the first and second magnetic layers. The first magnetic layer is magnetostatically coupled with the second magnetic layer in a region where the temperature of the third magnetic layer has reached the Curie temperature or more. An information reproduction method of reproducing information from the medium is also disclosed.

9 Claims, 6 Drawing Sheets

TEMPERATURE DISTRIBUTION IN TRACK CENTER

FIG. 2A *PRIOR ART*
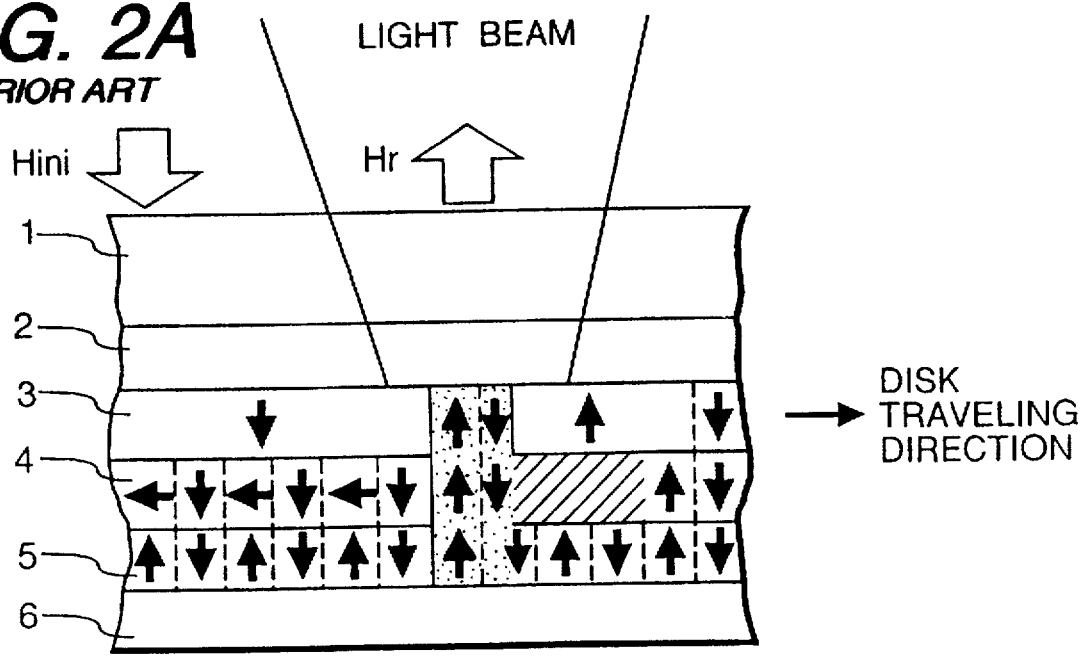
FIG. 2B *PRIOR ART*
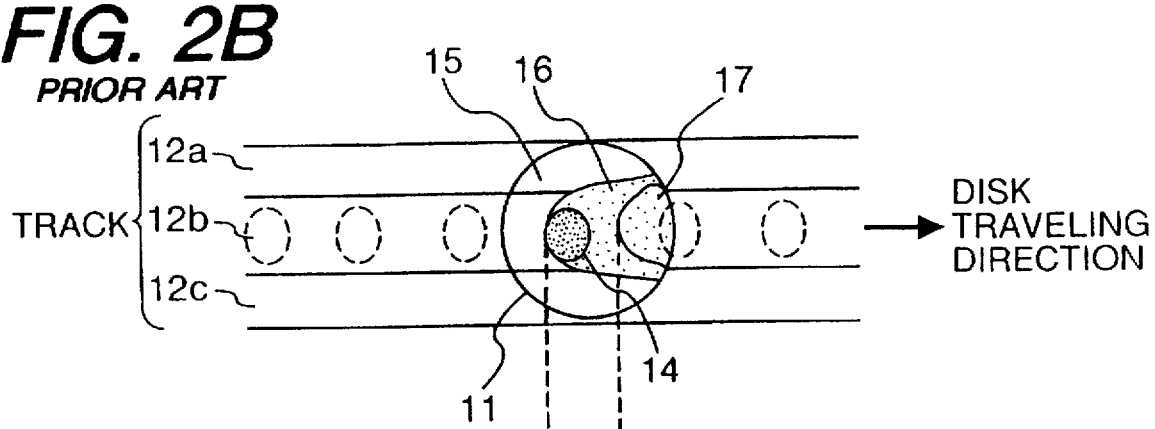
FIG. 2C *PRIOR ART*
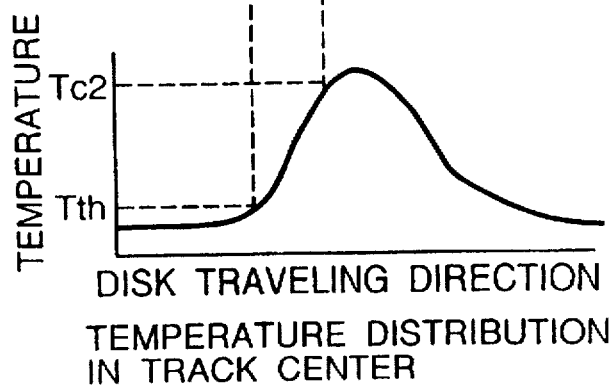
TEMPERATURE DISTRIBUTION IN TRACK CENTER

TEMPERATURE DISTRIBUTION IN TRACK CENTER

MAGNETO-OPTICAL RECORDING MEDIUM CAPABLE OF SUPER RESOLUTION REPRODUCTION AND INFORMATION REPRODUCTION METHOD USING THE SAME

BACKGROUND OF THE INVENTION

1. Field of the Invention

The present invention relates to a magneto-optical recording medium for optically recording and reproducing information using a light beam and an information reproduction method using the same and, more particularly, to a magneto-optical recording medium which can attain a high recording density and an information reproduction method using the same.

2. Related Background Art

As a rewritable, high-density recording medium, a great deal of attention has been paid to a magneto-optical recording medium on which information is recorded by writing magnetic domains on a magnetic thin film using thermal energy from a semiconductor laser, and from which the information is read out by using a magneto-optical effect. Recently, demands has arisen for a large-capacity recording medium having a higher recording density than such a magneto-optical recording medium. The linear recording density of an optical disk, e.g., this magneto-optical recording medium, greatly depends on the laser wavelength k for a reproduction optical system and the numerical aperture (NA) of an objective lens. More specifically, when the reproduction light wavelength and the numerical aperture of the objective lens are determined, the diameter of the beam is determined. For this reason, the minimum length of a mark which can be reproduced is limited to about $\lambda/2NA$. The track density is limited by the crosswalk between adjacent tracks, and depends on the spot diameter of a reproduction beam, similar to the minimum mark length. In order to realize a high recording density by using a conventional optical disk, therefore, the laser wavelength for the reproduction optical system must be decreased, or the numeral aperture (NA) of the objective lens must be increased. In consideration of element efficiency, generation of heat, and the like, it is difficult to decrease the laser wavelength. On the other hand, an increase in the numeral aperture of the objective lens makes it difficult to process the lens. In addition, the distance between the lens and the disk becomes so short that mechanical problems are posed, e.g., collision of the optical system with the disk. For this reason, efforts have been made to develop techniques of increasing the recording density by devising novel structures for recording media and reading methods. For example, according to the magneto-optical recording medium disclosed in Japanese Laid-Open Patent Application No. 4-229432, a medium structure like the one shown in (a) to (c) in FIG. 1 is proposed as a super resolution technique of realizing a recording density exceeding the optical resolution of reproduction light. (a) in FIG. 1 is a sectional view of an optical disk which serves an example of the super resolution technique disclosed in this patent. A substrate 1 is generally made of a transparent material, such as a glass or polycarbonate material. Guide grooves or guide marks for guiding information tracks are formed in the substrate 1 in advance. Information is recorded/reproduced along these guide grooves or guide marks, defining concentrical or helical information tracks on the substrate 1.

An interference layer 2, a first magnetic layer (to be referred to as a reproduction layer hereinafter) 3, a third magnetic layer (to be referred to as an intermediate layer hereinafter) 4, a second magnetic layer (to be referred to as a memory layer hereinafter) 5, and a protective layer 6 are stacked on the substrate 1 in the order named. The interference layer 2 is used to improve the Kerr effect. The protective layer 6 is used to protect the magnetic layers. The arrows illustrated in the magnetic layers indicate the iron group element sublattice magnetization directions in the film. A Bloch magnetic wall extends in a direction perpendicular to the film surface at each boundary position where the magnetization directions are opposite. The memory layer 5 is a film having a large perpendicular magnetization anisotropy, e.g., a TbFeCo or CyFeCo film. Magnetic domains are formed depending on whether the magnetization of this layer is directed upward or downward with respect to the film are surface, thus holding information. The reproduction layer 3 is a film having a small coercive force and a high Curie temperature, e.g., a GdFeCo film. The Curie temperature of the intermediate layer 4 is set to be lower than that of the reproduction layer 3 and the memory layer 5. The intermediate layer 4 therefore reaches its Curie temperature with a temperature rise caused by reproduction power.

These three magnetic films exchange-coupled with each other at room temperature. Since the coercive force of the memory layer 5 is strongest at this time, magnetic domains representing information stored in the memory layer 5 are transferred to the reproduction layer 3. (c) in FIG. 1 shows a temperature gradient at the center of a data track when information reproduction light the disk having this medium structure from the substrate 1 side. When this state is viewed from the substrate 1, an isotherm of a predetermined temperature T1 is present within a spot, as shown in (b) in FIG. 1. At the temperature T1, the intermediate layer 4 reaches almost its Curie temperature, and the exchange-coupled state between the reproduction layer 3 and the memory layer 5 is cut off. When a reproduction magnetic field Hr is applied to the disk at this time, the magnetization of the region above the temperature T1, i.e., the region indicated by a mask 17 in (b) in FIG. 1, aligns itself with the direction of the reproduction magnetic field Hr, regardless of the magnetization direction of the memory layer 5. Therefore, this portion does not contribute to signal reproduction, and signal reproduction is substantially performed by using only the region indicated by an aperture 16. As a result, a recorded mark 14 smaller than a spot 11 can be reproduced.

According to the super resolution reproduction methods disclosed in Japanese Laid-Open Patent Application Nos. 3-93058 and 4-255946, a medium constituted by a reproduction layer 3, an intermediate layer 4, and a memory layer 5 is used, as shown in (a) to (c) in FIG. 2. Prior to information reproduction, the magnetization directions of the reproduction layer 3 are aligned in one direction by using an initialization magnetic field Hb, and the magnetic domain information in the memory layer 5 is masked. At this time, interface magnetic domain wall energy exists in a direction parallel to the film surface at each portion where the magnetization direction of the memory layer 5 is opposite to the initialization direction of the reproduction layer 3. The intermediate layer 4 has the function of confining this interface magnetic domain wall therein and adjusting the magnetic domain wall energy. Thereafter, a light spot 11 irradiates on the medium. In a low-temperature region of the resultant temperature distribution of the medium, the initialized state of the reproduction layer 3 is maintained (a front mask 15 is formed). In a high-temperature region exceeding the Curie temperature of the intermediate layer 4, the reproduction layer 3 is forcibly aligned (a rear mask 17 is formed) in the direction of a reproduction magnetic field Hr. With this operation, magnetic domain information in the memory layer 5 can be transferred only in an intermediate-temperature range, thereby reducing the effective size of a reproduction spot. This allows reproduction of a recorded mark 14 below the diffraction limit of light to increase the linear density.

In these known super resolution schemes, since the front mask 15 extends along the direction of adjacent tracks, efforts have been made to increase the track density as well as the linear recording density.

In the super resolution reproduction method disclosed in Japanese Laid-Open Patent Application No. 4-229432, however, since only the rear mask 17 is used, a sufficient increase in resolution cannot be attained. In addition, since no aperture limitations are imposed in the radial direction of the disk, a high track density cannot be expected. In the methods disclosed in Japanese Laid-Open Patent Application Nos. 3-93058 and 4-255946, although the resolution can be increased without a deterioration in signal quality, the magnetization directions of the reproduction layer 3 must be aligned in one direction prior to information reproduction. For this purpose, an initialization magnet Hini must be added to the conventional apparatus.

As described above, the conventional super resolution reproduction methods have various problems. For example, the sufficient increase in resolution cannot be attained, the magneto-optical recording/reproducing apparatus is complicated which increases its cost, and a reduction in the size of the apparatus is difficult to attain.

SUMMARY OF THE INVENTION

The present invention has been made to solve the above problems, and has as its object to provide a magneto-optical recording medium which allows reproduction of a recorded mark below the diffraction limit of light with high signal quality using a simple structure requiring no initialization and reproduction magnetic fields in a reproduction process, and to provide a magneto-optical information reproduction method using the medium.

The object can be achieved by a magneto-optical recording medium comprising:

a first magnetic layer which becomes an in-plane magnetization film at room temperature, and a perpendicular magnetization film at a temperature between room temperature and the Curie temperature of the layer;

a second magnetic layer which has a Curie temperature lower than the Curie temperature of the first magnetic layer, remains a perpendicular magnetization film from room temperature to the Curie temperature thereof, and is stacked on the first magnetic layer; and a third magnetic layer which is arranged between the first and second magnetic layers and has a Curie temperature lower than the Curie temperatures of the first and second magnetic layers, wherein the first magnetic layer is magnetostatically coupled with the second magnetic layer in. A region where the temperature of the third magnetic layer has reached a temperature not less than the Curie temperature thereof.

In addition, the above object can be achieved by an information reproduction method of reproducing information from a magneto-optical recording medium including a first magnetic layer which becomes an in-plane magnetization film at room temperature, and a perpendicular magnetization film at a temperature between room temperature and the Curie temperature of the layer, a second magnetic layer which has a Curie temperature lower than the Curie temperature of the first magnetic layer, remains a perpendicular magnetization film from room temperature to the Curie temperature thereof, and is stacked on the first magnetic layer, and a third magnetic layer which is arranged between the first and second magnetic layers and has a Curie temperature lower than the Curie temperatures of the first and second magnetic layers, the first magnetic layer being magnetostatically coupled with the second magnetic layer in a region where the temperature of the third magnetic layer has reached a temperature not less than the Curie temperature thereof, comprising:

the step of irradiating the medium with a beam spot;

the step of raising a temperature of only a region of the third magnetic layer, which corresponds to a portion of the beam spot, to a temperature not less than the Curie temperature thereof to magnetostatically couple the first and second magnetic layers with each other, and transferring information stored in the second magnetic layer to the first magnetic layer; and the step of reproducing the transferred information on the basis of light reflected by the medium.

Furthermore, the above object can be achieved by an information reproduction method of reproducing information from a magneto-optical recording medium including a first magnetic layer which becomes an in-plane magnetization film at room temperature, and a perpendicular magnetization film at a temperature between room temperature and the Curie temperature of the layer, the first magnetic layer having a compensation temperature between room temperature and the Curie temperature, a second magnetic layer which has a Curie temperature lower than the Curie temperature of the first magnetic layer, remains a perpendicular magnetization film from room temperature to the Curie temperature thereof, and is stacked on the first magnetic layer, and a third magnetic layer which is arranged between the first and second magnetic layers and has a Curie temperature lower than the Curie temperatures of the first and second magnetic layers, the first magnetic layer being magnetostatically coupled with the second magnetic layer in a region where the temperature of the third magnetic layer has reached a temperature not less than the Curie temperature thereof, comprising:

the step of irradiating the medium with a beam spot; and the step of keeping the in-plane magnetization of the first magnetic layer in a first region in the beam spot, raising the temperature of the third magnetic layer in a second region in the beam spot to a temperature not less than the Curie temperature thereof to magnetostatically couple the first and second magnetic layers with each other, transferring information stored in the second magnetic layer to the first magnetic layer, and raising the temperature of the first magnetic layer to a temperature not less than the compensation temperature thereof in a third region in the beam spot to orient magnetization of the first magnetic layer in a predetermined direction; and the step of reproducing the transferred information on the basis of light reflected by the medium.

wherein the second region is sandwiched between the first and second regions in a traveling direction of the beam spot.

The present invention will be described in detail in the following embodiments.

BRIEF DESCRIPTION OF THE DRAWINGS

FIG. 2 is a view showing another conventional super resolution technique;

DETAILED DESCRIPTION OF THE PREFERRED EMBODIMENTS (First Embodiment)

The first embodiment of the present invention will be described in detail below with reference to the accompanying drawings.

Figure 1A:
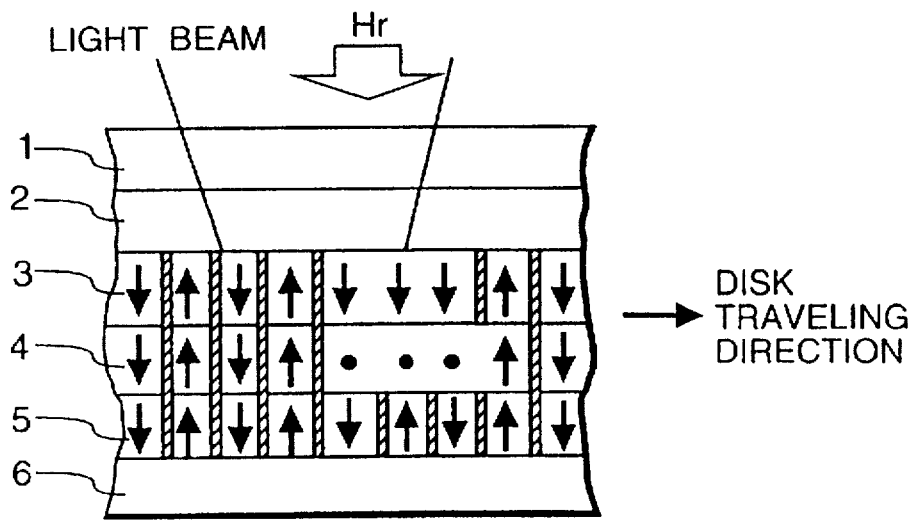
FIG. 1 is a view showing a conventional super resolution technique.
Figure 1B:
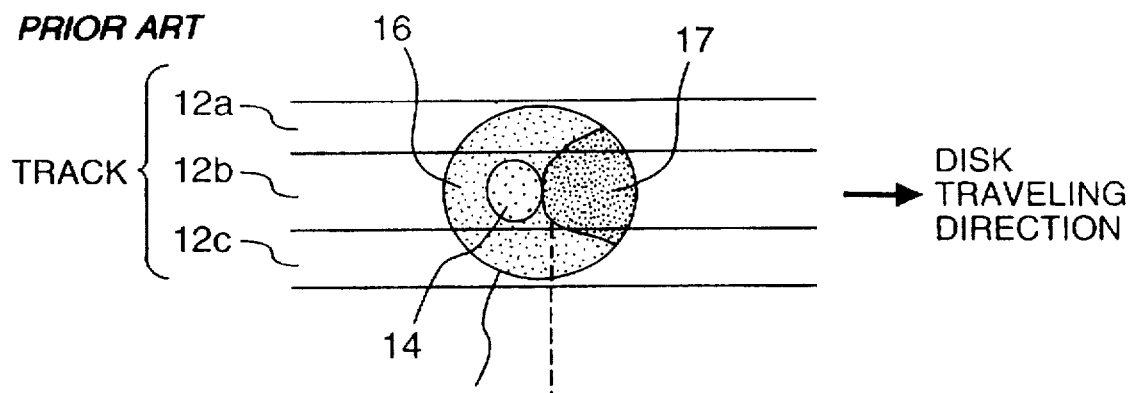
Figure 1C:
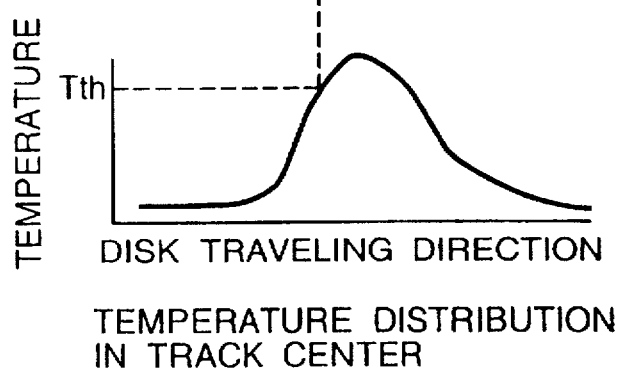
Figure 3:
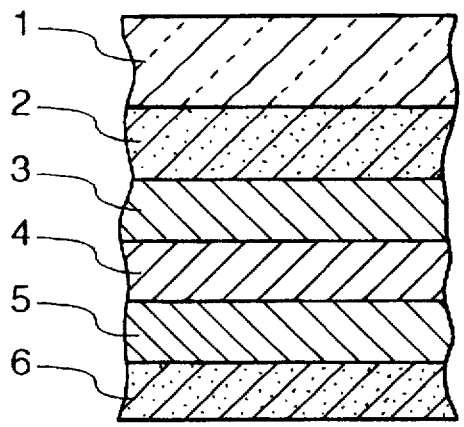
FIG. 3 is a sectional view of a magneto-optical recording medium according to the first embodiment of the present invention.

FIG. 3 is a sectional view of a magneto-optical recording medium (to be referred to as an optical disk hereinafter) according to this embodiment. As shown in FIG. 3, the optical disk used in this embodiment is obtained by stacking an interference layer 2, a first magnetic layer (to be referred to as a reproduction layer hereinafter) 3, a third magnetic layer (to be referred to as an intermediate layer hereinafter) 4, a second magnetic layer (to be referred to as a memory layer hereinafter) 5, and a protective layer 6 on a substrate 1 in the order named. The substrate 1 is generally made of a transparent material, such as a glass or polycarbonate material. These layers can be deposited/formed by continuous sputtering performed by a magnetron sputtering apparatus or continuous vacuum evaporation. The interference layer 2 is formed to improve the magneto-optical effect, and is made of a transparent dielectric material such as $Si_3N_4$, AlN, $SiO_2$, SiO, ZnS, or $MgF_2$. The protective layer 6 is used to protect the magnetic layers, and is made of the same material as that for the interference layer 2. Since the interference layer 2 and the protective layer 6 are irrelevant to the gist of the present invention, no problems are posed in terms of structure even if they are omitted. A description of these layers will therefor be omitted. Although not shown, the protective layer 6 may be coated with a hard coat material, such as an ultraviolet-curing resin to protect the film or allow the use of a magnetic field head for a magnetic field modulation overwrite operation.

The memory layer 5 is a layer for holding recorded information. Note that this layer maintains its perpendicular magnetization from room temperature to the Curie temperature. The memory layer 5 needs to stably hold small magnetic domains having sizes of 1 μm or less. The material for the memory layer 5 may be one having a large perpendicular magnetic anisotropy and being capable of stably holding a magnetized state, e.g., a rare earth-iron group amorphous alloy, such as TbFeCo, DyFeCo, or TbDyFeCo, garnet, a platinum group-iron group periodic structure film, such as a Pt/Co or Pd/Co film, or a platinum group-iron group alloy, such as PtCo or PdCo. The Curie temperature of the memory layer 5 is directly associated with the laser power required to record information. If this temperature is too high, the recording sensitivity deteriorates. For this reason, the Curie temperature is preferably set to 280° C. or less, or more preferably, 240° C. or less.

The reproduction layer 3 serves as a layer used for reproduction of magnetization information held in the memory layer 5 and exhibits magnetization characteristics such that it serves as an in-plane magnetization film at room temperature; and a perpendicular magnetization film at a predetermined temperature (Tth) or more between room temperature and the Curie temperature. Note that the temperature at which a transition from an in-plane magnetization film to a perpendicular magnetization film takes place is preferably set to be near the Curie temperature of the intermediate layer, more specifically, within ±50° C., and more preferably, within ±30° C. The reproduction layer 3 is located closer to the incident side of light than the intermediate layer 4 and the memory layer 5. In order to prevent a decrease in the Kerr rotation angle in the reproduction mode, the Curie temperature of the reproduction layer 3 is set to be at least 270° C. or more, which is higher than that of the intermediate layer 4 and the memory layer 5, more preferably, 300° C. or more. The reproduction layer 3 is preferably made of a rare earth-iron group element amorphous alloy having a small perpendicular magnetic anisotropy, more specifically, GdFeCo. In addition, in order to increase the Kerr rotation angle on the short wavelength side, a light rare earth metal, such as Nd, Pr, or Sm, may be added to the above material. A material having a compensation temperature between room temperature and the Curie temperature is preferably used.

Assume that the reproduction layer 3 and the memory layer 5 are made of ferrimagnetic rare earth-iron group element amorphous alloy thin films. In this case, it suffices if the reproduction layer 3 is rare earth element (RF) sublattice magnetization dominant and the memory layer 5 is iron group element (TM) sublattice magnetization dominant at room temperature, or both the reproduction layer 3 and the memory layer 5 are RE sublattice magnetization dominant at room temperature. With the use of a ferrimagnetic rare earth-iron group element amorphous alloy thin film, the above structure can be easily realized. This film is therefore suitable for each magnetic layer of the medium of the present invention.

The intermediate layer 4 is formed to achieve the following two objects:

(1) To reduce the magnetic domain wall energy between the reproduction layer 3 and the memory layer 5 so as to help the reproduction layer 3 to become an in-plane magnetization film in the temperature range from room temperature to the temperature near a Curie temperature Tc3 of the intermediate layer 4. This also contributes to a reduction in the thickness of the reproduction layer 3.

(2) To cancel the exchange-coupled state between the reproduction layer 3 and the memory layer 5 and to magnetostatically couple them with each other at a temperature near the Curie temperature Tc3 of the intermediate layer 4 or more.

In order to achieve these objects, the intermediate layer 4 is positioned between the reproduction layer 3 and the memory layer 5, and the Curie temperature Tc3 is set to be higher than room temperature and lower than Curie temperatures Tc1 and Tc2 of the reproduction layer 3 and the memory layer 5. The Curie temperature Tc3 of the intermediate layer 4 is set to be low enough to cancel the exchange coupling force by a beam spot having a power near the reproduction power. More specifically, the Curie temperature is preferably set to be 80° C. or more and 220° C. or less, more preferably, 100° C. or more and 180° C. or less. As the material for the intermediate layer 4, for example, a rare earth-iron group amorphous alloy, specifically, GdFeCo, is preferably used. In order to lower the Curie temperature, a non-magnetic element such as Cr, Al, Si, or Cu, may be added to the above material.

An element for improving corrosion resistance, e.g., Al, Tl, Pt, Nb, or Cr, may be added to the reproduction layer 3, the intermediate layer 4, and the memory layer 5. In order to improve the thermal conductivity, a layer having a high thermal conductivity, e.g., an Al, AlTa, AlTi, AlCr, or Cu layer, may be formed. In addition, this medium may include an initialization layer whose magnetization is aligned in one direction to perform an optical modulation overwrite operation, and an auxiliary layer as an auxiliary recording/ reproducing layer for adjusting the exchange coupling force or the magnetostatic coupling force.

A data signal is recorded on the optical disk of the present invention by moving the medium and modulating the laser power while applying a magnetic field in a predetermined direction (optical modulation recording). Alternatively, the signal is recorded by modulating an external magnetic field while irradiating a medium with a laser beam having a constant power to raise the temperature of the memory layer 5 to a temperature near the Curie temperature Tc2 (magnetic field modulation recording).

In the former case, if the intensity of a laser beam is adjusted to raise the temperature of only a predetermined region in a beam spot to the Curie temperature Tc2, a recording domain smaller than the beam spot diameter can be formed. As a result, a signal having a period below the diffraction limit of light can be recorded. In the latter case, a small recording domain can be formed by increasing the modulation frequency of a magnetic field as compared with the relative velocity (linear velocity) of the beam spot with respect to the medium.

Figure 4A:
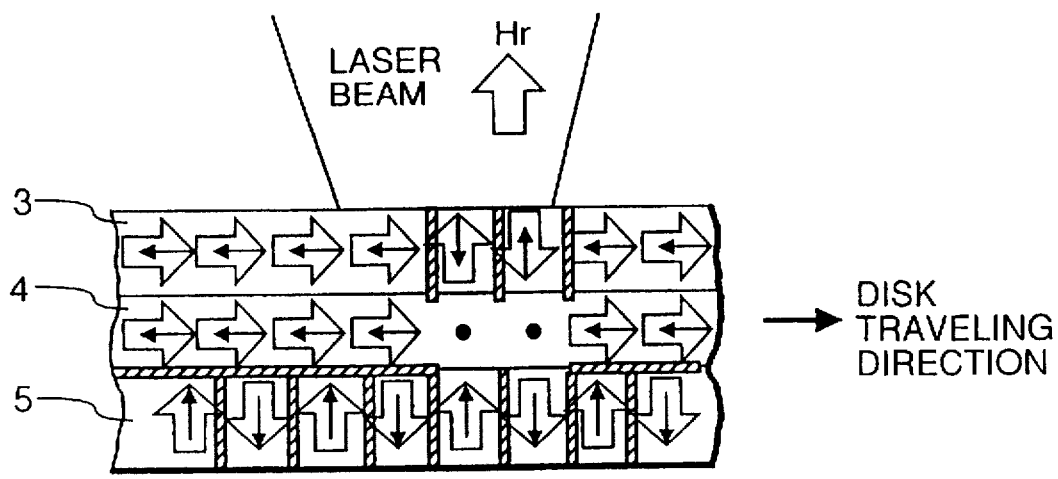
FIG. 4 is a view showing the principle of the present invention.
Figure 4B:
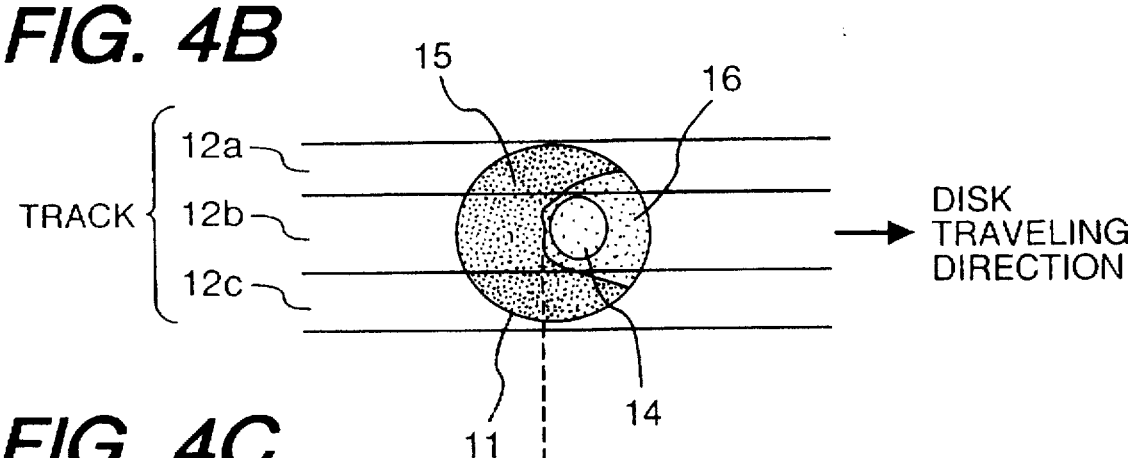
Figure 4C:
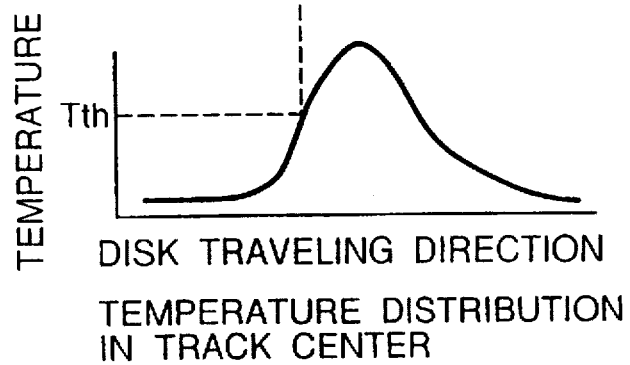

(a) to (c) in FIG. 4 show the state of a spot when the optical disk of the present invention is moved to the right while the laser beam irradiates on the disk. Referring to (a) in FIG. 4, the thin arrows in each magnetic layer indicate iron group element sublattice magnetization directions; and the thick open arrows, represent net magnetization directions. At this time, the disk moves at about 5 to 15 m/s, and the position at which the film temperature is maximized is behind the center of a laser spot in the traveling direction of the laser spot.

Figure 5:
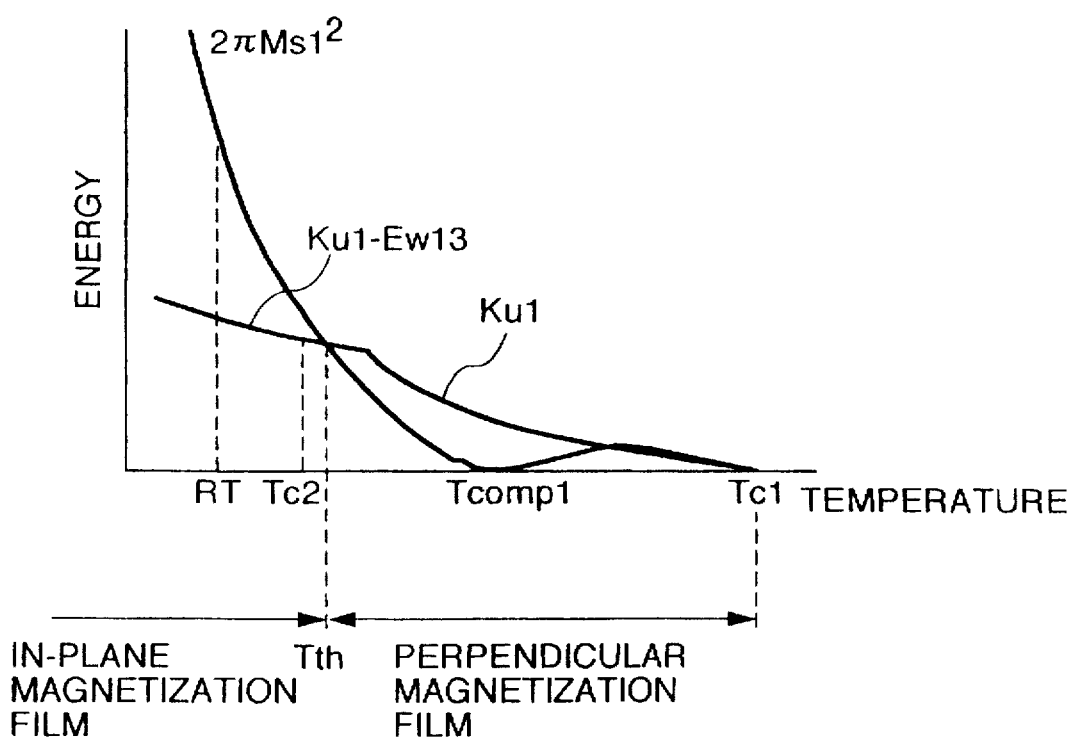
FIG. 5 is a graph showing the relationship between the temperature and energy of a reproduction layer in FIG. 3.

FIG. 5 shows the temperature dependence of the anisotropic energy of the reproduction layer 3. In this case, since the reproduction layer 3 is made RE sublattice magnetization dominant to relatively increase saturation magnetization Ms1 at room temperature, the saturation magnetization abruptly decreases toward the compensation temperature between room temperature and the Curie temperature. Consequently, an energy $2\pi Ms1^2$ that acts to direct the magnetization in the plane of the film abruptly lowers from room temperature toward the compensation temperature. Meanwhile, a perpendicular magnetic anisotropy Ku1 of the reproduction layer 3 gradually decreases from room temperature toward the Curie temperature. In this case, as is generally known, if the energy and the direction of magnetization in the reproduction layer as a single layer satisfy $$2\pi Ms1^2 > Ku1 \qquad (1)$$

then, the magnetization of the reproduction layer 3 becomes an in-plane magnetization. According to the present invention, however, since the reproduction layer 3 is stacked on the intermediate layer 4, having sufficiently large saturation magnetization and serving as an in-plane magnetization film from room temperature to the Curie temperature, an exchange force Ew13 acts from the intermediate layer 4 to the reproduction layer 3 in a direction to reduce the perpendicular magnetic anisotropy Ku1. Since the exchange force Ew13 decreases toward the Curie temperature of the intermediate layer 4, a net perpendicular magnetic anisotropy Ku1-Ew13 is represented by the curve shown in FIG. 5.

In the stacked film in the present invention, therefore, the magnetization of the reproduction layer 3 becomes an in-plane magnetization when the following inequality holds:

$$2\pi Ms1^2 > Ku1 - Ew13 \qquad (2)$$

That is, as the temperature of the magnetic layer rises, a transition from an in-plane magnetization film to a perpendicular magnetization film occurs with a temperature Tth being a threshold, as shown in FIG. 5.

Figure 6:
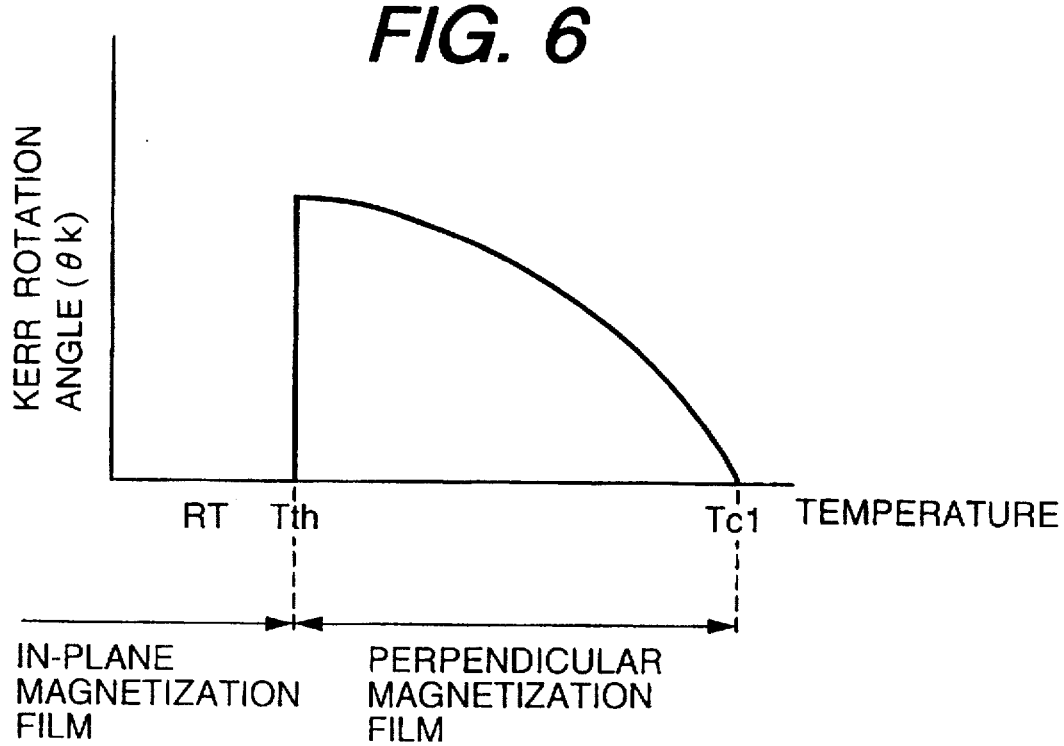
FIG. 6 is a graph showing the temperature dependence of the Kerr rotation angle of the reproduction layer in FIG. 3.

FIG. 6 shows the temperature dependence of the Kerr rotation angle of the reproduction layer 3 which is based on a polar Kerr effect. As shown in FIG. 6, in the neighborhood of room temperature, the film is in-plane magnetized, and hence almost no Kerr rotation angle $\theta k$ appears. When the temperature rises to the temperature Tth, the transition to perpendicular magnetization occurs in the reproduction layer 3, and the Kerr rotation angle abruptly occurs.

Figure 7:
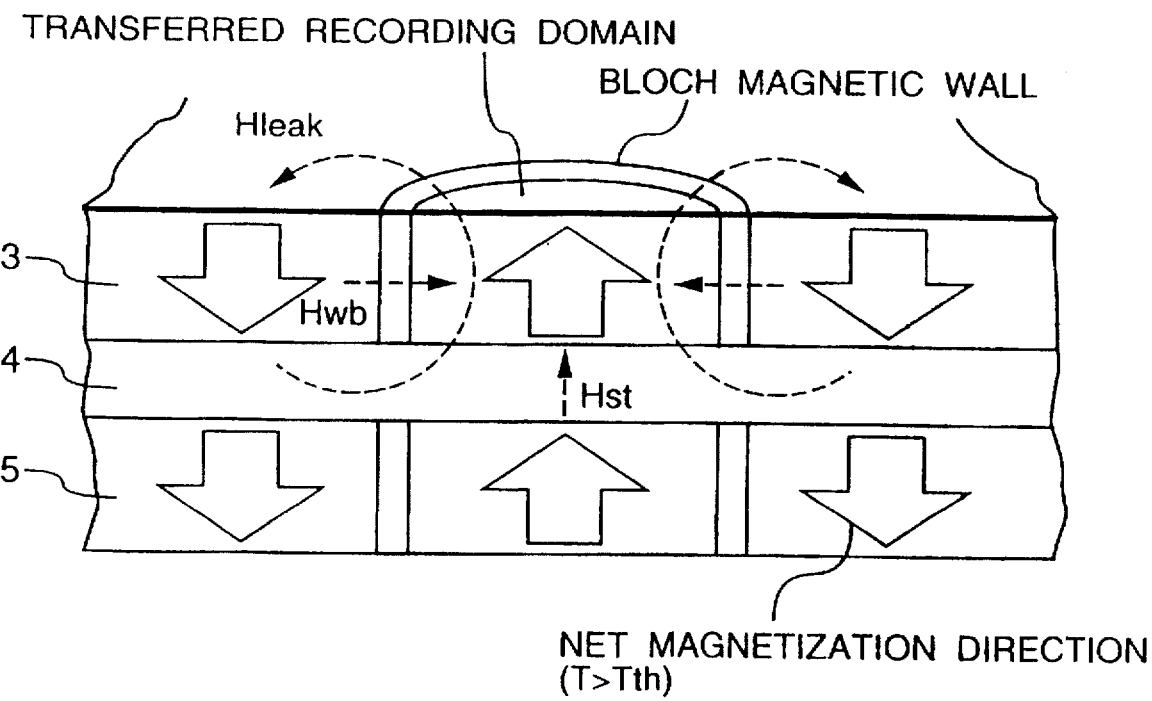
FIG. 7 is a view showing magnetic fields applied to a transferred magnetic domain at an aperture portion in FIG. 4.

In the magneto-optical recording medium of the present invention, an aperture is formed by transferring a magnetic domain owing to magnetostatic coupling with the memory layer 5 when the transition of the reproduction layer 3 to a perpendicular magnetization film occurs. FIG. 7 shows the magnetized states of the magnetostatically coupled layers. Referring to FIG. 7, the thick open arrows indicate the net magnetization directions of the respective layers. Assume that the thick open arrows pointing up indicate the erasing direction, and those pointing down indicate the recording direction. Since recorded information is stored in the form of the magnetization directions in the memory layer 5, the composition of the layer is adjusted such that the magnetization of the memory layer 5 is not influenced by temperature changes during reproduction. Since the temperature of the intermediate layer 4 has reached the Curie temperature, no exchange coupling force strength acts between the reproduction layer 3 and the memory layer 5, and the magnetization directions in the reproduction layer 3 are determined by magnetostatic energy balance.

FIG. 7 shows a state wherein a magnetic domain in the memory layer 5 is transferred to the reproduction layer 3. The three magnetic fields in FIG. 7 are applied to the transferred recording domain. A leakage magnetic field Hleak leaks from the reproduction layer 3 in the erasing direction. Since the magnetic circuit is closed while a magnetic domain is transferred, the leakage magnetic field Hleak acts in a direction to help transfer the magnetic domain. A magnetic field Hwb is generated by Bloch magnetic wall energy, and is given by:

$$Hwb = \sigma wb / 2Ms1 \cdot r \qquad (3)$$

where σwb is the Bloch magnetic wall energy, and is the radius of the magnetic domain. Since the Bloch magnetic wall energy is stable in the direction in which the volume of the Bloch magnetic wall decreases, the magnetic field Hwb acts in a direction to make the transferred magnetic domain contract. Consider the energy balance between these magnetic fields and a magnetostatic field Hst from the memory layer 5. In this case, if the following inequality is satisfied:

$$Hst+Hleak>Hwb \qquad (4)$$

then, a magnetic domain in the memory layer 5 is transferred to the reproduction layer 3 when the transition of the reproduction layer 3 from an in-plane magnetization film to a perpendicular magnetization film occurs with a rise in temperature. If inequality (4) is not satisfied, no recording domain is transferred to the reproduction layer 3, and the magnetic domains in the reproduction layer 3 align in the erasing direction, regardless of the memory layer 5.

That is, in the magneto-optical recording medium of the present invention, the magnetic fields Hst and Hleak must have high strength. Since these magnetic fields are proportional to the saturation magnetization of the memory layer 5 and the reproduction layer 3, respectively, the saturation magnetization of the reproduction layer 3 and the memory layer 5 is preferably set to be 50 emu/cc or more, more preferably, 100 emu/cc or more, at temperatures during reproduction, i.e., temperatures near the temperature Tth.

As shown in (a) to (c) in FIG. 4, the temperature of the medium at the leading edge side with respect to the traveling direction of the spot 11 is relatively low, i.e., a temperature equal to or less than the temperature Tth. Both the reproduction layer 3 and the intermediate layer 4 therefore are in-plane magnetization films. In this case, even if the intermediate layer 4 is a perpendicular magnetization film, the magnetic super resolution technique of the present invention can be realized by increasing the in-plane anisotropy of the reproduction layer 3 to make it serve as an in-plane mask. Preferably, however, the saturation magnetization of the intermediate layer 4 is set to be larger than that of the reproduction layer 3 to make the intermediate layer 4 have the function of absorbing interface magnetic domain wall energy. With this function, even if the reproduction layer 3 decreases in thickness, since the magnetization is in the in-plane direction, no magnetic domain in the memory layer 5 is transferred, and a front mask can be stably formed, as compared with the case wherein the intermediate layer 4 is a perpendicular magnetization film. In the region on the trailing edge side of the spot where the temperature has risen to a temperature equal to or more than the temperature Tth, inequality (4) holds, and a magnetic domain in the memory layer 5 is transferred while the transition of the reproduction layer 3 to a perpendicular magnetization film occurs, thereby forming an aperture.

In this case, since the Kerr rotation angle of reflected light of the irradiated spot 11 is influenced by only the aperture region, information can be reproduced on the basis of this reflected light.

As described above, by using the magneto-optical recording medium of the present invention, only a range smaller than an information reproduction spot can be used for information reproduction. Therefore, the linear recording density of the magneto-optical recording medium can be increased. In addition, as is apparent from the aperture shape in (b) in FIG. 4, since the aperture can also be regulated in the track width direction, an increase in track density can be attained. That is, the present invention can increase both the linear density and the track density, and hence can greatly increase the overall recording capacity.

(Second Embodiment)

The second embodiment of the present invention will be described with reference to the accompanying drawings.

Almost the same materials as those in the first embodiment can be used for magnetic layers in this embodiment. If GdFeCo is used for a reproduction layer 3, the compensation temperature of the reproduction layer is highly dependent on the composition of the rare earth element, in particular. For this reason, if a magnetic layer mainly containing GdFeCo is used as the reproduction layer 3, the content of Gd is preferably set to be 24 to 35 at%.

In the medium of this embodiment, a high resolution is obtained by dividing the beam spot region into three regions (a front mask, an aperture, and a rear mask) depending on the temperature in the beam spot, as will be described later. Letting Tth1 be the boundary temperature between the front mask and the aperture, the Curie temperature Tc3 of an intermediate layer 4 is set to be near the temperature Tth1. Letting Tth2 be the boundary temperature between the aperture and the rear mask, the compensation temperature Tcomp1 of the reproduction layer is set to be near the temperature Tth2. In order to ensure a sufficient aperture region during reproduction of a signal, the compensation temperature Tcomp1 needs to be higher than the temperature Tc3 by 20° C. or more, preferably, 30° C. or more. In order to protect the recording domains in a memory layer 5 during reproduction, the Curie temperature Tc2 of the memory layer 5 needs to be higher than the compensation temperature Tcomp1 of the reproduction layer 3 by 10° C. or more, and preferably, 20° C. or more. In addition, in a region where the temperature is equal to or higher than the compensation temperature of the reproduction layer 3, the net magnetization of the reproduction layer 3 is in the reverse direction to the net magnetization of the reproduction layer 3 to set the reproduction layer 3 and the memory layer 5 in an antimagnetostatically coupled state, thereby forming a rear mask. For this reason, the memory layer 5 must not have a compensation temperature equal to or higher than the temperature at which the reproduction layer 3 and the memory layer 5 are magnetostatically coupled to each other. With this process, both the aperture and rear mask regions can be held in the same magnetized state.

Similar to the first embodiment, as an information recording method for the medium of this embodiment, the method of modulating the laser power or the method of modulating an external magnetic field is used.

As will be apparent from a mechanism to be described later, in order to stably attain a super resolution in this embodiment, the magnetization around a recorded mark must be directed opposite to that of the recorded mark. In a general optical modulation recording operation, however, a constant, high laser power is set while a constant magnetic field is applied, and the magnetization of a track on which information is to be recorded is initialized (an erasing operation). Thereafter, the laser power is intensity-modulated, while the magnetization direction is reversed, thereby forming a desired recorded mark. Portions with random magnetization directions around the recorded mark cause noise when information is reproduced. In order to improve the reproduction signal quality, therefore, an erasing operation is generally performed in a range wider than the recorded mark. Since the magnetization around a recorded magnetic domain is directed opposite to that of the magnetic domain, a super resolution can be stably operated in the present invention with a conventional optical modulation recording scheme.

As another optical modulation recording scheme, an optical modulation overwrite mode is available. This scheme uses a medium having a structure like the one disclosed in Japanese Laid-Open Patent Application No. 62-175948, and need not perform an erasing operation before a recording operation. This medium includes a write layer whose magnetization is aligned in one direction before a recording operation, in addition to a memory layer 5. When information is to be recorded on this medium, the laser intensity is modulated between Ph and P1 (Ph>p1) in accordance with the information to be recorded while a constant magnetic field is applied in a direction opposite to the magnetization of the write layer. When the temperature of the medium rises to a temperature Th corresponding to the intensity Ph, since the temperature is set to be almost equal to a temperature Tc of the write layer, the magnetizations of the memory layer 5 and the write layer align themselves in the external magnetic field direction, thereby forming a magnetic domain. When the temperature of the medium rises to a temperature T1 corresponding to the intensity P1, the magnetization of the memory layer 5 aligns itself with that of the write layer. This process occurs regardless of the presence/absence of magnetic domains recorded in advance. Consider a case wherein a laser beam having the intensity Ph, irradiates on the medium. Although the temperature of a portion where a recording domain is to be formed has risen to the temperature Th, this temperature distribution spreads two-dimensionally. For this reason, even if the intensity of the laser beam is increased to the intensity Ph, a portion whose temperature has only risen to the temperature T1 is always present around the magnetic domain. Consequently, a portion whose magnetization direction is opposite to that of the recording domain exists around a recording domain. That is, a high-resolution is stably obtained in the present invention even with the conventional optical modulation overwrite recording scheme.

As still another recording method, the above magnetic field modulation recording method is available. In this method, while a high-power laser beam is DC-irradiated, the direction of an external magnetic field is alternately changed. In order to record new information without leaving any hysteresis of the previously recorded magnetic domains, magnetic domains must be formed always with a constant width. In this case, therefore, if no measure is taken, regions with random magnetization directions are formed around recording domains, and super resolution cannot be stably obtained in the present invention. For this reason, in performing magnetic field modulation recording, an initializing operation must be performed with respect to a recording region using a power higher than the general recording power or the magnetization of the entire disk must be initialized before shipment of the medium or the first recording operation.

Figure 8:
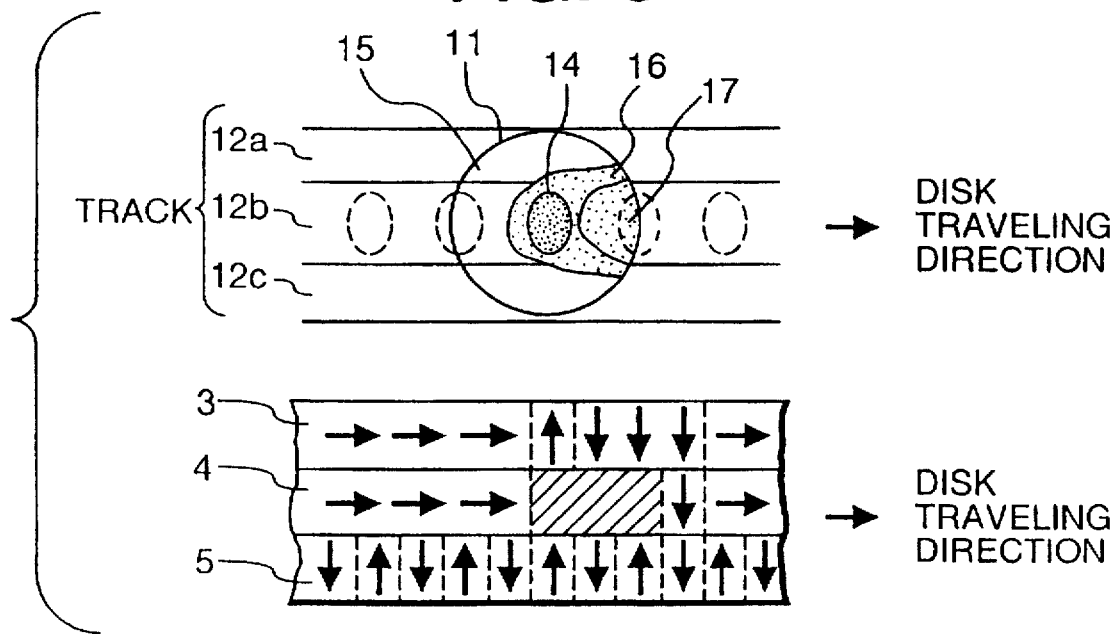
FIG. 8 is a view showing a magneto-optical recording medium and the reproduction principle according to the second embodiment of the present invention.

Referring to FIG. 8, the front mask portion and the aperture portion are formed by the same mechanism as that described in the first embodiment. That is, both the reproduction layer 3 and the intermediate layer 4 at the front mask portion become in-plane magnetization films, and the front mask portion makes no contribution to the Kerr effect. When the temperature of the magnetic layer rises to a temperature equal to or more than the temperature Tth, the reproduction layer 3 becomes a perpendicular magnetization film and is magnetostatically coupled with the magnetic domains of the memory layer 5.

In this embodiment, a rear mask is formed at a portion where the temperature of the medium further rises to a temperature equal to or more than the compensation temperature of the reproduction layer 3. The mechanism of the formation of this rear mask will be described with reference to FIG. 9.

Figure 9:
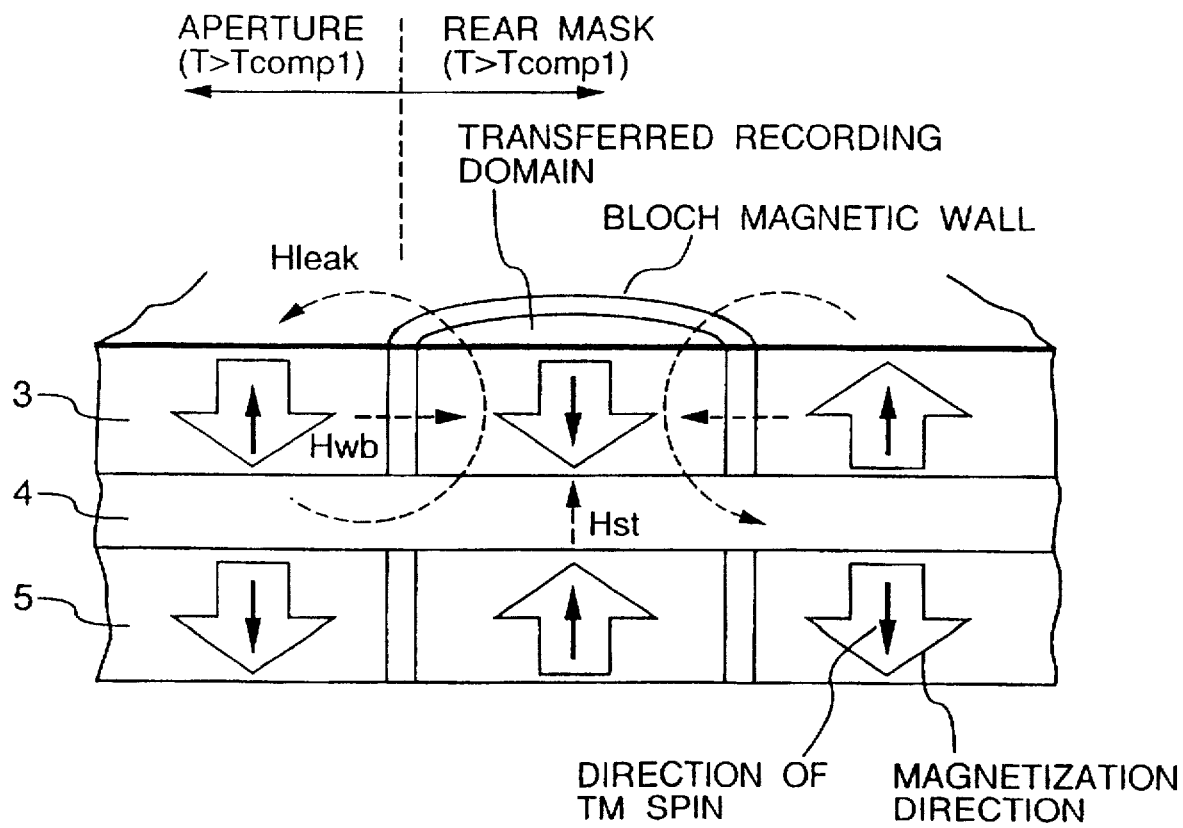
FIG. 9 is a view showing the state of a magnetic field at a rear mask in the second embodiment of the present invention.

When a magnetic domain magnetostatically coupled to the memory layer 5 at the compensation temperature Tcompl of the reproduction layer 3 or less enters a high-temperature region higher than the compensation temperature of the reproduction layer 3, the direction of the net magnetization of the reproduction layer 3 is reversed. As a result, the recording domain receives an antimagnetostatic force from the memory layer 5. The magnetostatic field, Hst, therefore acts to reverse the recording domain, similar to the magnetic field Hwb. FIG. 9 shows the magnetized state of the reproduction layer 3 before the magnetic domain is reversed. In this case, since a magnetic domain which has already been transferred in a vertical position is reversed, unlike the case wherein a magnetic domain is transferred in the process of a transition from an in-plane magnetization film to a perpendicular magnetization film, a coercive force, Hcl, of the reproduction layer 3, is added to inequality (4). In this case, if inequality (5) is satisfied, the Bloch magnetic wall of the transferred magnetic domain moves in the direction in which the magnetic domain contracts.

$$Hwb+Hst+Hleak>Hcl \tag{5}$$

In this inequality, Hleak is the leakage magnetic field from a portion around the magnetic domain of the reproduction layer 3. The direction of the leakage magnetic field at a portion whose temperature is lower than the temperature Tcompl is different from that at a portion whose temperature is higher than the temperature Tcompl. That is, the leakage magnetic field Hleak includes a magnetic field acting in a direction to make the magnetic domain contract and a magnetic field acting in a direction to hold the magnetic domain. Since Hleak in inequality (5) represents the sum total of these magnetic fields, this value may take either the "+" sign or the "−" sign.

If inequality (5) holds at the high-temperature portion of the spot, a rear mask in which the magnetization of the reproduction layer 3 aligns itself in the erasing direction at the high-temperature portion is formed, as shown in FIG. 8. As a result, a super resolution, having a double mask structure in which two masks including the front mask are present before and after a recorded mark, can be realized.

The magnetostatic field Hst from the memory layer 5 also acts in the erasing direction. When magnetization in the erasing direction is reversed by the magnetostatic field Hst, since a magnetic domain wall is formed in a wide range of a high-temperature region 5, the magnetic domain wall energy greatly increases. No magnetization reversal therefore occurs, and the magnetization is maintained in the same erasing direction. For this reason, in the high-temperature region, a region whose magnetization is oriented in the erasing direction is always formed, and this region serves as a rear mask.

In the conventional super resolution method, as disclosed in Japanese Laid-Open Patent Application No. 4-255947, a mask is formed by using an external magnetic field Hr according to inequality (6):

$$Hr>Hcl+Hwi \tag{6}$$

where Hwi is the interface magnetic domain wall energy between the reproduction layer 3 and the memory layer 5. In the present invention, a mask is formed by changing the effective magnetic field in the medium, mainly the influence of the magnetostatic field Hst, instead of using the external magnetic field Hr. No external magnetic field is therefore required in the present invention.

The value of the magnetostatic field Hst can be roughly calculated by assuming the recording domain to be a cylindrical magnetic domain and using the radius of the recording domain, the distance from the memory layer 5 to the magnetic domain, and magnetization Ms2 of the memory layer 5 (Tadashi Kobayashi, "Study on Magnetic Properties and Magneto-Optical Effects of Rare Earth-Iron Group Amorphous Alloy Thin Film and Composite Films", Nagoya University Doctoral Dissertation, pp. 40–41). The magnetostatic field Hst is proportional to the saturation magnetization Ms2 of the memory layer 5.

$$Hst \propto Ms2 \tag{7}$$

For this reason, the saturation magnetization Ms2 is preferably set to be large enough to maintain the stability of recorded information and to be small enough to inhibit reversal of erasing magnetization.

(Experimental Example 1)

Si, Gd, Tb, Fe, and Co targets were mounted in a DC magnetron sputtering apparatus, and a glass substrate having a diameter of 130 mm and a pre-grooved polycarbonate substrate were fixed to a substrate holder placed at a distance of 150 mm from the targets. Thereafter, the chamber was evacuated by a cryopump to $1\times10^{-5}$ Pa or less. During evacuation, Ar gas was introduced into the chamber up to 0.4 Pa. A 90-nm thick SiN interference layer, a 40-nm thick GdFeCo reproduction layer, a 10-nm thick GdFe intermediate layer, a 35-nm thick TbFeCo memory layer, and a 70-nm thick SiN protective layer were then sequentially formed, thereby obtaining a magneto-optical recording medium which realizes the first embodiment of the present invention in FIG. 3. In forming each SiN dielectric layer, $N_2$ gas was introduced in addition to the Ar gas, and reactive sputtering was performed such that the refractive index of the formed film was set to 2.1 by adjusting the mixture ratio of the gases.

The composition of the GdFeCo reproduction layer was $Gd_{30}(Fe_{60}Co_{40})_{70}$. At room temperature, in an RE rich atmosphere, the saturation magnetization Ms was 280 emu/cc; the compensation temperature was 250° C.; and the Curie temperature was 300° C. or more. This reproduction layer was an in-plane magnetization film at room temperature.

The composition of the GdFe intermediate layer was $Gd_{45}Fe_{55}$. At room temperature, in an RE rich atmosphere, the saturation magnetization Ms was 540 emu/cc; and the Curie temperature was 160° C. This layer had no compensation temperature. The intermediate layer was also an in-plane magnetization film.

The composition of the TbFeCo memory layer was $Tb_{20}(Fe_{80}Co_{20})_{80}$. At room temperature, in a TM rich atmosphere, the saturation magnetization Ms was −200 emu/cc; and the Curie temperature was 250° C.

The medium was evaluated in the following manner.

A magnetic domain having a mark length of 0.78 µm was recorded on this magneto-optical recording medium first. The magnetic domain was then observed with a polarizing microscope. Since the reproduction layer and the intermediate layer were in-plane magnetization films at room temperature, no recording domain was observed. When the temperature of the medium was raised by irradiating with light using a 780-nm semiconductor laser, a magnetic domain of the memory layer was transferred at the central portion (high-temperature region) of a beam spot with a certain laser power. As a result, a region where a magnetic domain could be observed was formed. It was confirmed from the contrast at this time that the magnetization of the reproduction layer had the same direction as that of the memory layer.

The recording/reproduction characteristics of this magneto-optical recording medium were measured next. In performing the measurement, the NA of the objective lens was set to 0.55; and the laser wavelength was set to 780 nm. In addition, the recording power was set within the range of 7 to 13 mW, and the reproduction power was set within the range of 3.0 to 4.0 mW, so as to obtain the maximum CNR. The linear velocity was 9m/s. The entire surface of the medium was subjected to an erasure process first, and 5.8-, 11.3-, and 15-MHz signals (corresponding to mark lengths of 0.78 µm, 0.40 µm, and 0.30 µm, respectively) were then recorded on the medium. The mark length dependence of the CNR of the medium was checked.

Furthermore, the crosstalk between adjacent tracks (to be referred to as crosstalk hereinafter) was measured as follows. A signal corresponding to a mark length of 0.78 µm was recorded on a land portion by the above method. The resultant carrier level (represented by C1) was measured with a spectrum analyzer. Thereafter, tracking control was performed with respect to an adjacent groove portion having undergone an erasure process, and a signal (represented by C2) leaking from the adjacent land was measured. The crosswalk was expressed by the ratio of these signals (C2/C1). The effective track pitch was 0.8 µm because the experiment was conducted on the assumption that data were recorded on both the lands and grooves. Both the CNR and the crosstalk were measured without applying initialization and reproduction magnetic fields.

Table 1 shows the result. As is apparent from table 1, a high CNR can be obtained with a short mark length, and an improvement in crosstalk can be attained as compared with the conventional disks.

Note that when the composition of the intermediate layer was $Gd_{47}Fe_{53}$, good characteristics similar to those described above were obtained.

(Experimental Example 2)

Following the same procedures as those in Experimental Example 1, a 90-nm thick SiN interference layer, a 40-nm thick GdFeCo reproduction layer, a 10-nm thick GdFe intermediate layer, a 40-nm thick TbFeCo memory layer, and a 70-nm thick SiN protective layer were sequentially formed on a substrate to obtain a magneto-optical recording medium having a structure according to the present invention in FIG. 3.

The intermediate layer and the memory layer had the same compositions as those in Experimental Example 1. The composition of the GdFeCo reproduction layer was $Gd_{28}(Fe_{60}Co_{40})_{72}$. At room temperature, in an RE rich atmosphere, the saturation magnetization Ms was 200 emu/cc; the compensation temperature was 220° C.; and the Curie temperature was 300° C. or more. This reproduction layer was an in-plane magnetization film at room temperature.

A magnetic domain on the medium, formed in Experimental Example 2, was also observed with a polarizing microscope. When a laser for a heating operation was not turned on, no magnetic domain was observed as in Experimental Example 1. As the laser power was gradually increased, the magnetic domain of the memory layer was transferred and observed. It was confirmed that when the laser power was further increased, at the central portion (high-temperature region) of the beam spot, the transferred recording domain contracted and the magnetization was oriented in the erasing direction.

This magneto-optical recording medium was evaluated in the same manner as in Experimental Example 1. Table 1 shows the obtained result. In this case, an aperture is formed near the spot center, and is narrowed by a rear mask, resulting in a further increase in CNR. Since the aperture also extends in the track width direction, the crosstalk characteristics are slightly inferior to those in Experimental Example 1, but are superior to those of conventional recording media.

Known magnetic super resolution magneto-optical recording media were formed, and evaluation and measurement were performed in the same manner described above by using the same apparatuses as used in Experimental Examples 1 and 2.

(Comparative Experimental Example 1)

A medium similar to the one disclosed in Japanese Laid-Open Patent Application No. 3-93056 was formed and evaluated first. A 90-nm thick SiN interference layer, 30-nm thick GdFeCo reproduction layer, a 10-nm thick TbFeCoAl intermediate layer, a 40-nm thick TbFeCo memory layer, and a 70-nm thick SiN protective layer were sequentially formed on a glass substrate by using the same film formation apparatus and method as those in Experimental Example 1, thereby obtaining a magneto-optical recording medium for Comparative Experimental Example 1.

The composition of the GdFeCo reproduction layer was set such that the saturation magnetization Ms was −180 emu/cc and the Curie temperature was 300° C. or more at room temperature in a TM rich atmosphere.

The composition of the TbFeCoAl intermediate layer was set such that the saturation magnetization Ms was −160 emu/cc and the Curie temperature was 140° C. at room temperature in a TM rich atmosphere.

The composition of the TbFeCo memory layer was set such that the saturation magnetization Ms was −150 emu/cc and the Curie temperature was 250° C. at room temperature in a TM rich atmosphere.

The recording/reproduction characteristics of this magneto-optical recording medium were measured in the same manner as in Experimental Example 1. In this case, however, measurement was performed while the reproduction magnetic field applied to the medium in a direction perpendicular thereto was changed to 0, 200, and 400 Oe during the reproduction process. Table 1 shows the obtained result.

(Comparative Experimental Example 2)

A medium similar to the one disclosed in Japanese Laid-Open Patent Application No. 3-255946 was formed and evaluated next. A 90-nm thick SiN interference layer, a 30-nm thick GdFeCo reproduction layer, a 10-nm thick TbFeCoAl intermediate layer, a 16-nm thick GdFeCo auxiliary layer, a 40-nm thick TbFeCo memory layer, and a 70-nm thick SiN protective layer were sequentially formed on a glass substrate by using the same film formation apparatus and method as those used in Experimental Example 1, thereby obtaining a magneto-optical recording medium for Comparative Experimental Example 2.

The composition of the GdFeCo reproduction layer was set such that the saturation magnetization Ms was −160 emu/cc and the Curie temperature was 300° C. or more at room temperature in a TM rich atmosphere.

The composition of the TbFeCoAl intermediate layer was set such that the saturation magnetization Ms was −160 emu/cc and the Curie temperature was 140° C. at room temperature in a TM rich atmosphere.

The composition of the GdFeco auxiliary layer was set such that the saturation magnetization Ms was −160 emu/cc and the Curie temperature was 280° C. at room temperature in a TM rich atmosphere.

The composition of the TbFeCo memory layer was set such that the saturation magnetization Ms was −150 emu/cc and the Curie temperature was 250° C. at room temperature in a TM rich atmosphere.

The recording/reproduction characteristics of this magneto-optical recording medium were measured in the same manner as in Experimental Example 1. In this case, however, measurement was performed while the initialization magnetic field applied to the medium in a direction perpendicular thereto was changed to 0, 1,000, and 2,000 Oe before the reproduction process, and the reproduction magnetic field applied to the medium was changed to 0, 200, and 400 Oe. Table 1 shows the obtained result.

As has been described above, according to the magneto-optical recording medium of the present invention, both the CNR and crosstalk characteristics can be improved without applying a reproduction magnetic field or both an initialization magnetic field and a reproduction magnetic field, and both the linear recording density and the track density can be increased.

TABLE 1

|  | Initial Magnetic Field [Oe] | Reproduction Magnetic Field [Oe] | CNR | | | Crosstalk |
| --- | --- | --- | --- | --- | --- | --- |
|  |  |  | 0.78 μm [dB] | 0.40 μm [dB] | 0.30 μm [dB] | 0.78 μm [dB] |
| Experimental Example 1 | 0 | 0 | 47 | 43 | 35 | −28 |
| Experimental Example 2 | 0 | 0 | 48 | 44 | 38 | −25 |
| Comparative Experimental Example 1 | 0 | 0 | 48 | 18 | 5 | −12 |
| Comparative Experimental Example 1 | 0 | 200 | 48 | 30 | 18 | −13 |
| Comparative Experimental Example 1 | 0 | 400 | 48 | 44 | 36 | −19 |
| Comparative Experimental | 0 | 0 | 48 | 21 | 2 | −15 |

TABLE 1-continued

|  | Initial Magnetic Field [Oe] | Reproduction Magnetic Field [Oe] | CNR 0.78 μm [dB] | CNR 0.40 μm [dB] | CNR 0.30 μm [dB] | Crosstalk 0.78 μm [dB] |
|---|---|---|---|---|---|---|
| Example 2 Comparative Experimental Example 2 | 1000 | 400 | 48 | 26 | 8 | −17 |
| Comparative Experimental Example 2 | 2000 | 400 | 48 | 29 | 13 | −19 |
| Comparative Experimental Example 2 | 3000 | 200 | 48 | 30 | 20 | −19 |
| Comparative Experimental Example 2 | 4000 | 400 | 48 | 44 | 34 | −30 |

As has been described above, by using the magneto-optical recording medium and reproduction method of the present invention, a magnetic domain smaller in diameter than the beam spot can be reproduced by using a simple apparatus requiring no reproduction and initialization magnetic fields. At the same time, by suppressing crosstalk from an adjacent track, both the linear recording density and the track density can be greatly increased to allow a high-density recording/reproducing operation.

What is claimed is:

1. A magneto-optical recording medium comprising:

a first magnetic layer which becomes an in-plane magnetization film at room temperature, and a perpendicular magnetization film at a temperature between room temperature and the Curie temperature of said layer;

a second magnetic layer which has a Curie temperature lower than the Curie temperature of said first magnetic layer, remains a perpendicular magnetization film from room temperature to the Curie temperature thereof, and is stacked on said first magnetic layer; and a third magnetic layer which is arranged between said first and second magnetic layers and has a Curie temperature lower than the Curie temperatures of said first and second magnetic layers, wherein said first magnetic layer is magnetostatically coupled with said second magnetic layer in a region where the temperature of said third magnetic layer has reached a temperature not less than the Curie temperature thereof.

2. A medium according to claim 1, wherein said first, second, and third magnetic layers consist of rare earth-transition metal element amorphous alloys.

3. A medium according to claim 1, wherein said first magnetic layer has a compensation temperature between room temperature and the Curie temperature.

4. A medium according to claim 3, wherein the compensation temperature is set to be not less than the Curie temperature of said second magnetic layer.

5. A medium according to claim 4, wherein the compensation temperature is higher than the Curie temperature of said second magnetic layer by not less than 20° C.

6. A medium according to claim 1, wherein the region satisfies $$Hst+Hleak>Hwb$$

for $Hwb=\sigma wb/2Ms1 \cdot r$ where σwb is a Bloch magnetic wall energy, r is a radius of a magnetic domain, Ms1 is the saturation magnetization of said first magnetic layer, Hwb is the magnetic field generated by the Bloch magnetic wall energy, Hleak is the leakage magnetic field, and Hst is the static magnetic field.

7. A medium according to claim 3, wherein magnetization of said first magnetic layer is oriented in one direction in a region where the following condition is satisfied, $$Hst+Hleak+Hwb>Hc1$$

for $Hwb=\sigma wb/2Ms1 \cdot r$

σwb is a Bloch magnetic wall energy, r is a radius of a magnetic domain, Ms1 is the saturation magnetization of said first magnetic layer, Hwb is the magnetic field generated by the Bloch magnetic wall energy Hleak is the leakage magnetic field of said first magnetic layer, Hst is the static magnetic field applied form said second magnetic layer to said first magnetic layer, and Hc1 is the coercive force of said first magnetic layer.

8. An information reproduction method of reproducing information from a magneto-optical recording medium including: a first magnetic layer which becomes an in-plane magnetization film at room temperature, and a perpendicular magnetization film at a temperature between room temperature and the Curie temperature of the layer, a second magnetic layer which has a Curie temperature lower than the Curie temperature of the first magnetic layer, remains a perpendicular magnetization film from room temperature to the Curie temperature thereof, and is stacked on the first magnetic layer, and a third magnetic layer which is arranged between the first and second magnetic layers and has a Curie temperature lower than the Curie temperature of the first and second magnetic layer, the first magnetic layer being magnetostatically coupled with the second magnetic layer in a region where the temperature of the third magnetic layer has become not less than the Curie temperature thereof, said method comprising:

the step of irradiating the medium with a beam spot;

the step of raising the temperature of only a region of the third magnetic layer, which corresponds to portion of the beam spot, to a temperature not less than the Curie temperature thereof to magnetostatically couple the first and second magnetic layers with each other, and transferring information stored in the second magnetic layer to the first magnetic layer; and the step of reproducing the transferred information on the basis of light reflected by the medium.

9. An information reproduction method of reproducing information from a magneto-optical recording medium including: a first magnetic layer which becomes an in-plane magnetization film at room temperature, and a perpendicular magnetization film at a temperature between room temperature and the Curie temperature of the layer, the first magnetic layer having compensation temperature between room temperature and the Curie temperature, a second magnetic layer which has a Curie temperature lower than the Curie temperature of the first magnetic layer, remains a perpendicular magnetization film from room temperature to the Curie temperature thereof, and is stacked on the first magnetic layer, and a third magnetic layer which is arranged between the first and second magnetic layers and has a Curie temperature lower than the Curie temperatures of the first and second magnetic layers, the first magnetic layer being magnetostatically coupled with the second magnetic layer in a region where the temperature of the third magnetic layer has become not less than the Curie temperature thereof, said method comprising:

the step of irradiating the medium with a beam spot; and the step of keeping the in-plane magnetization of the first magnetic layer in a first region in the beam spot, raising the temperature of the third magnetic layer in a second region in the beam spot to a temperature not less than the Curie temperature thereof to magnetostatically couple the first and second magnetic layers with each other, transferring information stored in the second magnetic layer to the first magnetic layer, and raising the temperature of the first magnetic layer to a temperature not less than the compensation temperature thereof in a third region in the beam spot to orient the magnetization of the first magnetic layer in a predetermined direction; and the step of reproducing the transferred information on the basis of light reflected by the medium, wherein the second region is sandwiched between the first and third regions in a traveling direction of the beam spot.

* * * * *

UNITED STATES PATENT AND TRADEMARK OFFICE
CERTIFICATE OF CORRECTION

PATENT NO. : 5,790,513

DATED : August 4, 1998

INVENTORS : TOMOYUKI HIROKI, ET AL.

It is certified that error appears in the above-identified patent and that said Letters Patent is hereby corrected as shown below:

COLUMN 1,
Line 24, "demands" should read --demand--.
Line 28, "k" should read --$\lambda$--.
Line 41, "numeral" should read --numerical--.
Line 58, "an" should read --as an--.

COLUMN 2,
Line 15, "are" should be deleted--.
Line 24, "films" should read --films are--.
Line 30, "the" should read --irradiates the--.

COLUMN 3,
Line 28, "the" (first occurrence) should read --a--.
Line 59, "in. A" should read --in a--.
Line 65, "including" should read --including:--.

COLUMN 4,
Line 18, "a" (first occurrence) should read --the--.
Line 29, "including" should read --including:--.
Line 52, "and" should be deleted.

UNITED STATES PATENT AND TRADEMARK OFFICE
CERTIFICATE OF CORRECTION

PATENT NO. : 5,790,513

DATED : August 4, 1998

INVENTORS : TOMOYUKI HIROKI, ET AL.

It is certified that error appears in the above-identified patent and that said Letters Patent is hereby corrected as shown below:

COLUMN 5,
Line 61, "therefor" should read --therefore--.

COLUMN 6,
Line 60, "the" (first occurrence) should read --a-- and after "near", "a" should read --the--.

COLUMN 7,
Line 15, "element" should read --element,--.
Line 49, "on" should be deleted.

COLUMN 9,
Line 10, "Hwb" should read --Hwb,--.

COLUMN 11,
Line 24, "beam" should read --beam,--.
Line 25, "on" should be deleted.

UNITED STATES PATENT AND TRADEMARK OFFICE
CERTIFICATE OF CORRECTION

PATENT NO.  : 5,790,513

DATED       : August 4, 1998

INVENTORS   : TOMOYUKI HIROKI, ET AL.

It is certified that error appears in the above-identified patent and that said Letters Patent is hereby corrected as shown below:

COLUMN 12,
Line 11, "therefore" should read --therefore,--.

COLUMN 15,
Line 13, "as" should read --as those--.

COLUMN 18,
Line 36, "σwb" should read --where σwb--.
Line 39, "energy" should read --energy,--.
Line 41, "form" should read --from--.
Line 56, "temperature" (second occurrence) should read --temperatures--.
Line 57, "layer," should read --layers,--.

COLUMN 20,
Line 3, "and" should be deleted.

Signed and Sealed this

Seventeenth Day of August, 1999

Attest:

Q. TODD DICKINSON

Attesting Officer

Acting Commissioner of Patents and Trademarks